US005731250A

United States Patent [19]

Reid et al.

[11] Patent Number: 5,731,250
[45] Date of Patent: Mar. 24, 1998

[54] CORROSION RESISTANT CERAMIC BODIES

[75] Inventors: John S. Reid, Wooster; Thomas Szymanski, Hudson, both of Ohio

[73] Assignee: Norton Chemical Process Products Corporation, Stowe, Ohio

[21] Appl. No.: 870,897

[22] Filed: Jun. 6, 1997

Related U.S. Application Data

[63] Continuation of Ser. No. 758,991, Dec. 2, 1996, abandoned.

[51] Int. Cl.$^6$ ................................................ C04B 35/106
[52] U.S. Cl. .......................... 501/106; 501/107; 501/108
[58] Field of Search .......................... 501/106, 107, 501/108

[56] References Cited

U.S. PATENT DOCUMENTS 4,106,947  8/1978  Recasens et al. ...................... 501/107

FOREIGN PATENT DOCUMENTS 0675035  7/1979  U.S.S.R. ............................. 501/106

OTHER PUBLICATIONS

"Wear Resistant Glazes for Ceramic Floor Tiles" Puscasu et al. Mater Constr. (Bucharest) 1996, 26 (4), 268–271, 1996.

Bulletin CI-78 "Norton Ceramic Intalox® Saddles", Norton Chemical Process Products Corporation, pp. 1–8, author unknown, printed U.S.A. No Date Available.

*Primary Examiner*—Paul Marcantoni
*Attorney, Agent, or Firm*—David Bennett

[57] ABSTRACT

Ceramic bodies comprised mainly of zircon and wollastonite, with zircon being the dominant crystalline phase, show improved resistance to alkaline conditions at elevated temperatures than conventional bodies and excellent thermal stability.

7 Claims, No Drawings

CORROSION RESISTANT CERAMIC BODIES

This application is a continuation of application Ser. No. 08/758,991, filed Dec. 2, 1996, now abandoned.

BACKGROUND OF THE INVENTION

The present invention relates to ceramic bodies useful as tower packing elements that are resistant to alkaline conditions at elevated temperatures. More particularly this invention relates to ceramic bodies useful in heat exchanger or chemical processing units exposed to alkali-containing substances at temperatures from about 100° to 1000° C.

In heat exchanger or regenerator units, such as regenerative thermal oxidizer (RTO) units, a very hot gas exiting from a combustion chamber is passed into contact with a heat sink material which generally comprises a ceramic body either in the form of a monolith with obligatory passages or a plurality of individual shaped ceramic bodies. The material absorbs heat and later dissipates the heat. In the case of a heat regenerator, there are usually two heat exchange units containing heat sink material and a gas flow to be heated is passed through a first pre-heated heat exchange unit before it enters a combustion chamber. Upon exiting the combustion chamber the hot gas flow passes through the second heat exchange unit in which much of the heat is given up to the ceramic bodies. At an appropriate moment, the flow is reversed such that cool gas first enters the second unit containing ceramic bodies that have been previously heated by the hot outflowing gas. After leaving the combustion chamber the hot outflowing gas enters the first unit containing the ceramic bodies that have been cooled by contact with the inflowing gas before the flow reversal occurred.

In other applications the ceramic body may be a carrier for a catalyst or a guard bed to intercept particulate impurities in a gas stream before it contacts a catalyst bed. In still other applications the ceramic body may be in the form of a packing element for use in a mass transfer unit, a bed support or as hold-down media for use in chemical processing units.

This invention is particularly concerned with situations in which the hot gas contacting the ceramic bodies has an alkaline component. Typical ceramic media are severely degraded by such components over time and the degraded bodies need to be replaced. This is because the surface builds up a reaction layer which increases in thickness over time such that the effective free volume space is decreased. This free volume decrease eventually reached the point at which the increased pressure drop through the packed tower decreases the operating efficiency and performance of the unit which then has to be shut down to permit replacement of the packing. In addition to the cost of replacement bodies, the down time frequency represents a further economic penalty attributable to the use of ceramic shapes that are not alkali resistant.

One typical situation in which an alkaline environment is encountered at high temperatures is an RTO of the type described above for use in wood industry drier units. In this application the ceramic media are exposed to ash resulting from the combustion of airborne wood fibers. This wood ash contains significant amounts of alkaline components. When conventional ceramic bodies are used, the crystalline components of these ceramics comprise predominantly quartz and mullite phases. These phases are particularly susceptible to alkaline attack to generate layers of sodium aluminosilicate and/or a sodium-calcium-aluminum-silicate-sulfate complex. These can lead to the packing bodies becoming bonded together and to a significant decrease in the free volume within the tower.

There are therefore many situations in which a corrosion resistant ceramic body would be very advantageous. The present invention provides such a ceramic body with a novel composition that is well adapted to provide longer useful life when exposed to high temperature, alkaline environments.

The ceramic body however must, in addition to having increased alkali resistance, be formed from a shapeable mixture since such bodies need to be obtainable by a simple low cost method for their use to be economic.

A further requirement where the ceramic product is to be exposed in use to repeated thermal cycling is that this should not result in physical breakdown of the object. The test for such resistance is that it should be able to resist thermal cycling at least 125 times with each cycle having a low temperature of ambient temperature and a high of at least 870° C. with one cycle being completed at least every 45 minutes. A material is said to be "resistant to thermal cycling" as the term is used herein if such cycling results in zero breakages.

Some alkali-resistant materials that are known include silicon carbide, silicon nitride, fused cast zirconias and fused cast zirconia-mullites. These materials are known for example in glass manufacturing applications as lining materials. They are conventionally fused cast as blocks by very expensive energy intensive processes. They are therefore expensive and more importantly can not be shaped by conventional techniques to form the ceramic tower packing shapes required by the present applications. As a result they would not even be considered for such applications. Very pure alpha alumina media have also been described but the raw materials are very expensive and, to secure the very low porosity required for the target applications of the present invention, they must be heated to very high temperatures. The products therefore usually become prohibitively expensive for heat transfer applications.

The present invention provides a ceramic formulation that can be formed from economical raw materials and by conventional forming processes into shapes suitable to use as packing materials.

The invention also provides a formulation that can be sintered to essentially full density, (that is less than 5% open porosity), at 1200° to 1400° C.

The invention further provides a ceramic with improved alkali resistance by comparison with chemical porcelains at temperatures up to 1000° C. and outstanding resistance to thermal cycling.

In addition the present invention provides economic ceramic tower packings that meet all dimensional, mass, abrasion resistance and strength requirements for such applications that will also be usable at elevated temperatures under alkaline conditions while maintaining low pressure drop and thermal transfer characteristics for protracted periods.

SUMMARY OF THE INVENTION

The present invention provides a ceramic body with zircon representing the dominant crystalline component as shown by X-Ray diffraction analysis, said body being obtained by firing a composition comprising from 20 to 75% by weight of zircon, (zirconium silicate)and from 5 to 35% by weight of calcium silicate (or components that under firing conditions produce these amounts of zircon and/or calcium silicate in situ); and from 10 to 60% by weight of other ceramic-forming clay components selected from the group consisting of oxides and silicates of aluminum, alkaline earth metals, alkali metals, iron and titanium.

In another aspect the present invention provides a zircon-based ceramic body having an apparent porosity of less than one percent and a weight change per unit area of less than one percent under alkaline conditions at elevated temperatures.

The weight change per unit area under alkaline conditions is evaluated by exposing the ceramic body to potassium carbonate at 850° C. for a period of 10 hours. In this test the surface reaction layer obtained is found to contain the same components as reaction layers detected in ceramic bodies exposed to real world conditions such as in the treatment of gases from a wood drying kiln.

A "zircon-based body" is understood to refer to a body in which the dominant crystalline phase present in the body is zircon, and at least 20% of the total body weight calculated in terms of the oxides of the metallic components, is zirconia. This is shown by X-Ray diffraction analysis in which the various crystalline phases have their characteristic peaks. The crystalline phase with the largest peak registering in the spectrum is taken to be the dominant crystalline phase. Other crystalline phases such as quartz, mullite and cristobalite may be present but are generally not preferred. Other than the zircon, the ceramic body is preferably amorphous in nature rather than crystalline.

The ceramic body can be any component or structural element that in use is expected to encounter alkaline conditions at elevated temperatures. Typically such applications involve the use of the ceramic bodies as packings for heat or mass transfer applications. However they may also be spheres or pellets such as are used as catalyst supports or in guard beds, support beds or as hold-down media in chemical processing units.

These bodies can be either monolith products, such as honeycomb structures, (optionally with obligatory passages), or dumped packing elements with shapes determined by the requirement that they represent an optimization of the features of element surface area, strength, abrasion resistance and resistance to "nesting". To have the best effect, the elements should present as much surface to the hot gases as possible without causing the pressure drop through a unit containing such elements to become too great. This might occur if the elements packed in close together, or nested, such that the available volume of passageways for the hot gas through the unit is significantly reduced.

The preferred bodies are also capable of withstanding repeated thermal cycling between elevated temperatures, for example temperatures up to about 1000° C. to ambient temperatures without significant loss of strength or abrasion resistance.

The preferred physical form of the ceramic bodies is dependent to some extent on the desired application. For support beds or hold-down media, the preferred form is spheres or pellets. For heat or mass transfer applications the preferred shapes include saddles, multi-lobed structures (such as the structures disclosed in U.S. Pat. No. 5,304,423), "wagon wheels" (cylindrical structures with radial septa), and the like. Such shapes are preferably made by a molding or extrusion process.

The open porosity of the structures is preferably less than 5% and more preferably less than about 3%. The most preferred products have an open porosity less than 1%. The open porosity is measured by measuring the volume of water absorbed when a piece of the ceramic is immersed in water.

In addition to zircon and calcium silicate, (wollastonite), the body can comprise clays or other binders and ceramic forming components such as alumina, titania, nepheline syenite and other silicates such as feldspar. The function of the clays is to assist in the formation of the ceramic body by acting as a binder. The zircon and/or wollastonite can be formed, in part or completely, in situ during firing, as for example by the disproportionation of calcium zirconium silicate, or by the combination, under firing conditions, of other components.

Prior art ceramics typically used for the above applications are chemical ceramics made up primarily of ball clay and feldspar. The presently claimed ceramics are preferably made by compounding formulations comprising 20–65% of –200 mesh or finer zircon particles, 5 to 30% of –325 mesh or finer wollastonite particles, and 20 to 60% of –325 mesh or finer clay particles (all percentages being by weight of the combined ceramic forming components). These ceramic forming components are conventionally mixed with water to aid the mixing and optionally including additives such flow agents and surfactants, before they are shaped. They can be shaped by molding or, more frequently, by extrusion.

The shape or form of the body is often dictated by the application in which it is to be used. Generally however the shapes can be hollow bodies such as rings, optionally with diametrical septa, other hollow extruded structures, discs, and extruded monoliths with obligatory through passages. The shaped body is first dried to remove most of the water and then fired to form the final product and reduce the apparent open porosity to a minimum.

The firing temperature is conventionally about 1200°–1400° C. In general firing temperatures preferred in firing a ceramic with a crystal phase based predominantly on zircon are from 1225°–1300° C.

DETAILED DESCRIPTION OF THE INVENTION

The invention is further illustrated with reference to several specific formulations and their properties.

The ceramic body according to the present invention and several other ceramic materials were compared for their alkali resistance by exposing them to wood ash for 50 hours at 950° C. This test is carried out by placing the weighed ceramic articles in a sagger that has in the bottom a one quarter inch layer of wood ash. More wood ash is then poured over the articles till they are completely covered and the sagger is tapped to ensure the ash settles into contact with all parts of the articles.

The sagger is placed in a furnace and the temperature is ramped up at a 3° C./minute rate until the desired temperature is reached. The temperature is maintained at that level for the desired "soak" time and then cooled at the same rate as was used in the ramp up procedure. After cooling the samples are brushed free of ash, rinsed in water and then dried in an oven at 110° C. for two hours, cooled and then re-weighed. The change in weight for each is then normalized to give a weight change per unit surface area. The formulations used and the relevant physical properties of the products are set out in Table 1. An asterisk indicates that the value reported is an average of two. The shapes used were saddles similar to those described in U.S. Pat. No. 4,155,960 or Ty-Pak® HSM which are extruded ceramic "bow-tie" structures sold by Norton under that trade name.

In the Table:
"Δ" indicates "change".
"$H_2O$ ABSORP" is the water absorption as measured by ASTM C-373;
"POROSITY" is the % open porosity as measured by ASTM-C-373;
"APP. S.G." is the apparent specific gravity of the shape as determined by ASTM C-373;
"WT. GAIN" is the weight gain after exposure to the wood ash at 950° C. for the time specified.

The wood ash is prepared by burning wood and is homogenized to ensure that the batch used had a relatively uniform chemical composition. Wood ash from the same batch was used for all the evaluations.

Chemical analysis of the wood ash by XRF techniques indicated that it comprised 76.39% of calcium oxide; 6.41% of potassium oxide, 4.87% of magnesia; 2.69% of silica; 2.00% of alumina; 1.83% of phosphorus pentoxide; 1.10% of ferric oxide; 0.89% of manganous oxide; 0.83% of sodium oxide and 2.99% of other minor components.

TABLE 1

| TEST | UNITS | KOCH 60% ALUMINA | KOCH STONEWARE | NORTON PORCELAIN | INVENT. |
|---|---|---|---|---|---|
| SHAPE | | saddle | saddle | Ty-Pak HSM | Ty-Pak HSM |
| $H_2O$ ABSORP. | % | 21.0* | 4.62* | 0.20 | 0.22 |
| POROSITY | % | 37.8* | 10.3* | 0.5 | 0.57 |
| MAT. DENS. | g/cc | 1.81* | 2.24* | 2.41 | 2.64 |
| APP. S.G. | g/cc | 2.90* | 2.50* | 2.42 | 2.65 |
| 10 hr TEST SAMPLE VOL. | cc | 4.48 | 4.4 | 11.06 | 12.97 |
| SAMPLE WT. | g | 7.93 | 9.72 | 26.65 | 34.23 |
| SAMPLE AREA | $in^2$ | 4 | 4 | 8.64 | 9.87 |
| WT. Δ | g | 0.144 | 0.254 | 0.491 | 0.289 |
| % WT. Δ | % | 1.85 | 2.61 | 1.84 | 0.84 |
| WT. Δ/AREA | $g/in^2$ | 0.036 | 0.064 | 0.057 | 0.029 |
| 50 hr TEST SAMPLE VOL. | cc | 2.3 | 1.86 | 11.2 | 12.7 |
| SAMPLE WT. | g | 4.096 | 4.096 | 27 | 33.528 |
| SAMPLE AREA | $in^2$ | 2.4 | 2.4 | 8.64 | 9.87 |
| WT. Δ | g | 0.172 | 0.272 | 1.185 | 0.563 |
| % WT. Δ | % | 4.2 | 6.64 | 4.39 | 1.68 |
| WT. Δ/AREA | $g/in^2$ | 0.072 | 0.113 | 0.137 | 0.057 |

Analysis of the samples showed that where the ceramic material comprised quartz and/or mullite, the sample after the wood ash test had a surface layer that included $Na_2O$—$33NaAlSiO_4$ indicating a substantial chemical modification as a result of the up-take of alkali from the ash.

Since wood ash does not always have the same alkali content the same experiment was repeated except that the samples evaluated were buried under potassium carbonate powder in place of wood ash and the temperature was kept at 850° C. (since potassium carbonate fuses at about 880° C.).

The results obtained are shown in FIG. 2 below and show the same pattern of performance with the products according to the invention comfortably out-performing the prior art products.

TABLE 2

| PROPERTY | KOCH 60% ALUMINA | KOCH STONEWARE | NORTON PORCELAIN | INVENT. |
|---|---|---|---|---|
| SHAPE | Saddle | Saddle | Ty-Pak HSM | Ty-Pak HSM |
| $H_2O$ ABSORP. % | 21.0* | 4.62* | 0.2 | 0.22 |
| APP. POROSITY % | 37.8* | 10.3* | 0.57 | 0.5 |
| MAT. DENS. g/cc | 1.81* | 2.24* | 2.41 | 2.64 |
| APP.SP.GR. g/cc | 2.90* | 2.50* | 2.42 | 2.65 |
| Sample Vol. cc | 0.458 | 0.411 | 0.632 | 0.697 |
| Sample Wt. g | 0.815 | 0.908 | 1.523 | 1.839 |
| Sample Area in$^2$ | 0.715 | 0.666 | 0.751 | 0.832 |
| Wt. Δ g | 0.0281 | −0.0093 | −0.0116 | 0.0117 |
| % Wt. Δ | 2.676 | −1.024 | −0.782 | 0.895 |
| Wt. Δ/Area g/in$^2$ | 0.0305 | −0.014 | −0.0154 | 0.0141 |

Some of the data indicate a weight loss and this appears to correspond to those formulations having a large silica content. This indicates a far worse situation than the gradual closing up of the spaces between the bodies and sometimes the actual fusing together of the bodies. The weight loss indicates that the bodies are being corroded by the alkali.

X-Ray diffraction analysis of the materials evaluated above showed the following pattern of crystalline phases:

| PHASE | KOCH 60% ALUMINA | KOCH STONEWARE | NORTON PORCELAIN | INVENTION |
|---|---|---|---|---|
| QUARTZ | MODERATE | MAJOR | MAJOR | N.D. |
| MULLITE | MODERATE | MINOR | MODERATE | N.D. |
| α-ALUMINA | TRACE | N.D. | N.D. | N.D. |
| CRISTOBAL. | MAJOR | N.D. | N.D. | N.D. |
| ZIRCON | N.D. | N.D. | N.D. | MAJOR |

"CRISTOBAL." indicates cristobalite, and "N.D." indicates the phase was not detected.

Analysis of the product evaluated above as "Invent." showed that it comprised the following elements (in wt. % expressed as their oxides):

| Zirconia | 27.8% |
|---|---|
| Alumina | 12.4% |
| Silica | 48.5% |
| Ferric Oxide | 0.7% |
| Titania | 0.8% |
| Calcium Oxide | 8.6% |
| Magnesia | 0.4% |
| Sodium Oxide | 0.1% |
| Potassium Oxide | 0.7% |

The dominant crystalline phase was zircon. No mullite was detected.

Since the corrosion conditions experienced in commercial applications would be likely to be at least as demanding as those used in the tests, it is believed that the trends displayed in the results of the tests would be replicated, or even accentuated in commercial processes. Thus the conclusions reached are believed to be equally valid and applicable in commercial processes where ceramic materials are exposed to highly alkaline conditions at high temperatures.

The ceramic components of the invention were then subjected to thermal cycling in which samples were placed in a stainless steel basket with a diameter of about 30 cm to a depth of about 7.6 cm. This basket was placed in the a thermal cycle unit which comprised a vertical cylindrical, gas-fired, air-cooled chamber. The gas was ignited and the temperature raised from ambient levels to about 870° C. in a period of 18 minutes. Then the gas was turned off and air cooling was initiated to reduce the temperature to the original ambient level in a period of 18 minutes. Thus the complete cycle lasted 36 minutes. a further 135 cycles followed without pause and the samples were then removed from the test unit and examined. The results are given in Table 3 below.

TABLE 3

|  | INVENTION 1 | INVENTION 2 | COMMERCIAL PORCELAIN | COMMERCIAL STONEWARE |
| --- | --- | --- | --- | --- |
| C.S. BEFORE | 273 lb | 263 lb | 400 lb | — |
| C.S. AFTER | 416 lb | 402 lb | N/A | — |
| % BROKEN | 0 | 0 | 90, 75 | 55 |

"C.S." means crush strength, as measured by ASTM C-515.
"Invention 1" was fired from a mixture comprising 46.8% by weight of zircon and 16.5% by weight of wollastonite.
"Invention 2" was fired from a mixture comprising 42.13% by weight of zircon and 18.73% by weight of wollastonite.
In the case of both formulations according to the invention the balance was made up by ceramic forming components.
Two separate tests were conducted with the "Commercial Porcelain" samples. Both results are quoted.
"Commercial Porcelain" and "Commercial Stoneware" were commercially available ceramic mnaterials currently sold for the same applications as those for which the products according to the invention are intended.

From the above data it will therefore be clear that, by controlling the composition as taught in the present invention, it is possible to produce ceramic bodies that will be better adapted to function for prolonged periods at temperatures in excess of 700° C. without the need for overly frequent replacement.

What is claimed is:

1. A fired ceramic body consisting of from 20 to 75% by weight of zircon and from 5 to 35% by weight of calcium silicate, or compounds that, after firing at 1200° C. to 1400° C. yield these amounts of zircon and calcium silicate; and from 10 to 60% by weight of other ceramic-forming components selected from the group consisting of the oxides and the silicates of aluminum, alkaline earth metals, alkali metals, iron and titanium, wherein zircon is the only crystalline phase detectable by X-ray diffraction.

2. A ceramic body according to claim 1 in which at least 20% of the total body weight, calculated in terms of the oxides of the metallic components, is zirconia.

3. A ceramic body according to claim 1 in which the apparent open porosity is less than 5%.

4. A fired ceramic body according to claim 1 having a weight change per unit area of less than one percent when exposed to potassium carbonate at 850° C.

5. A ceramic body according to claim 1 in which zircon and calcium silicate together provide from 60 to 90% of the weight of the body.

6. A ceramic body according to claim 1 in a form suitable for uses selected from the group consisting of mass and heat transfer.

7. A ceramic body according to claim 1 in a form suitable for uses selected from the group consisting of catalyst supports, guard beds, support beds and hold-down beds.

* * * * *